(12) United States Patent
Jeon

(10) Patent No.: US 8,738,551 B2
(45) Date of Patent: May 27, 2014

(54) METHOD FOR STORING DATA IN MEMORY

(75) Inventor: Byeong Wook Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 217 days.

(21) Appl. No.: 13/271,879

(22) Filed: Oct. 12, 2011

(65) Prior Publication Data

US 2012/0323831 A1 Dec. 20, 2012

(30) Foreign Application Priority Data

Jun. 20, 2011 (KR) .................. 10-2011-0059773

(51) Int. Cl.
 *G06F 15/18* (2006.01)
(52) U.S. Cl.
 USPC .............................. 706/14; 701/59
(58) Field of Classification Search
 USPC .............................. 706/23; 701/59
 See application file for complete search history.

(56) References Cited

U.S. PATENT DOCUMENTS

| | | | | |
|---|---|---|---|---|
| 4,829,434 A * | 5/1989 | Karmel et al. | ............ | 701/59 |
| 5,651,353 A * | 7/1997 | Allston | ............ | 123/673 |
| 6,868,420 B2 * | 3/2005 | Perry et al. | ............ | 707/743 |
| 7,796,127 B2 * | 9/2010 | Lee et al. | ............ | 345/419 |
| 2007/0219720 A1 * | 9/2007 | Trepagnier et al. | ............ | 701/300 |
| 2011/0245954 A1 * | 10/2011 | Sullivan et al. | ............ | 700/104 |

FOREIGN PATENT DOCUMENTS

| | | |
|---|---|---|
| JP | 4-203235 A | 7/1992 |
| JP | 2003-296156 A | 10/2003 |
| JP | 2004-293593 A | 10/2004 |
| KR | 10-0470413 B1 | 2/2005 |
| KR | 10-2010-0001478 A | 1/2010 |
| KR | 10-1013965 B1 | 2/2011 |
| KR | 10-1029704 B1 | 4/2011 |
| WO | WO 01/95331 A2 | 12/2001 |

OTHER PUBLICATIONS

Hanan Samet. 1984. The Quadtree and Related Hierarchical Data Structures. ACM Comput. Surv. 16, 2 (Jun. 1984), 187-260.*

* cited by examiner

*Primary Examiner* — Jeffrey A Gaffin
*Assistant Examiner* — David H Kim
(74) *Attorney, Agent, or Firm* — Morgan, Lewis & Bockius LLP

(57) ABSTRACT

A method for storing data in a memory may include when the data may be obtained under a variable condition, determining a cell corresponding to an area of the variable condition from an entire memory area, storing the data in the cell and dividing the cell storing the data into a plurality of cells, and whenever a new data may be obtained under a new variable condition, determining a new cell corresponding to an area of the new variable condition under which the new data may be obtained, from the plurality of cells of the entire memory area and repeating storing of the new data and dividing of the new cell.

10 Claims, 4 Drawing Sheets

METHOD FOR STORING DATA IN MEMORY

CROSS-REFERENCE TO RELATED APPLICATION

The present application claims priority to Korean Patent Application No. 10-2011-0059773 filed Jun. 20, 2011, the entire contents of which is incorporated herein for all purposes by this reference.

BACKGROUND OF THE INVENTION

1. Field of the Invention

The present invention relates to a method for storing data in a memory. More particularly, it relates to a method for storing data in a memory, which can efficiently store a learning value, calculated based on each variable condition by a control unit of a vehicle, in a memory area.

2. Description of Related Art

In general, a control hydraulic pressure, a major parameter for controlling an automatic transmission, is determined as a function such as a vehicle speed, oil temperature, input torque, etc. and is controlled to an appropriate hydraulic pressure by controlling a solenoid valve based on the determined value during speed change.

However, this data is determined to obtain the best result in a normal transmission having a central hydraulic deviation, and the distribution of hydraulic pressures in a large number of mass-produced transmissions cannot be covered only by the normally determined value.

To overcome this problem, a transmission control unit (TCU) of the vehicle typically performs a learning control to calculate an offset value with respect to a hydraulic pressure value under each condition, thus achieving a predetermined target shift feeling under each operating condition.

The learning control in the vehicle is performed by the control unit under certain rules to optimally control the transmission, engine, etc., based on a driver's driving habit or tendency. During operation of the vehicle, when a predetermined learning condition is satisfied, a series of processes of calculating, storing and controlling a learning value are performed.

Also, in the control of the engine using a plurality of sensors, an engine control unit (ECU) controls the injection time (i.e., fuel amount) of an injector using self-learning data, thus optimally controlling the injector. Here, the control values according to sensor values are appropriately compensated by the learning.

For example, the learning control is used in air-fuel ratio correction, knocking correction, idle RPM correction, Throttle Position Sensor ("TPS") deterioration correction, etc., and the learning control is performed by slightly adjusting the information in a lookup table of the ECU.

Meanwhile, in order to perform the above-described learning control in the vehicle, a process in which a microprocessor of the control unit stores the learning value, calculated under each condition, in a specific area of a memory in real time, is required. Here, the memory area in which the learning value is to be stored is determined based on the conditions (such as various sensor values as parameters or other operating conditions) and then stored in the corresponding memory area.

However, conventionally, the storing of the learning values has the following drawbacks.

For example, in the case of the transmission control unit, it is very difficult to differentiate the conditions such as the vehicle speed, oil temperature, input torque, etc., under which the learning values are stored, due to limitations in the capacity of the internal memory for storing the learning values. Accordingly, a learning memory of 4×4 or 6×6 in size is typically used with respect to a single shift class.

Here, the same learning cell in the memory is shared under slightly different conditions, and thus different learning values calculated under different conditions may be stored in the same learning cell. As a result, the accuracy is significantly reduced when the stored learning values are applied to the corresponding control.

Therefore, when a memory having a very large capacity is used, it is possible to determine a learning value storing area with an increased size (e.g., 1000×1000 cells) for storing the learning values, but the number of learning times increases geometrically, which significantly reduces the speed of storing the learning values, thereby reducing the convergence efficiency of the learning values.

FIG. 1 is a diagram showing a conventional method for storing learning values, in which a learning value storing area of a memory is divided into a plurality of virtual cells, and the problems associated with the conventional method will be described in more detail with reference to FIG. 1 below.

Typically, in the control unit of the vehicle such as the Engine Control Unit ("ECU"), Transmission Control Unit ("TCU"), etc., the learning values are stored in a memory having a predetermined cell capacity (m×m). When a learning value data under each condition is obtained while a virtual memory space, in which the learning value data is to be stored, is divided into a plurality of predetermined cells, the learning value data is stored in a cell at a position corresponding to the condition.

Referring to FIG. 1, it can be seen that the memory area is pre-divided into a plurality of cells according to X and Y conditions. When a learning value according to the X and Y conditions is obtained, a cell at a position corresponding to the X and Y conditions is determined (i.e., a learning value storing area is determined), and the learning value is stored in the corresponding cell.

Here, in a state where the learning value is pre-stored in a specific cell under the same condition, if another learning value under a slightly different condition is obtained, the obtained learning value is overwritten in the same cell.

That is, even when different learning values A, B and C under different X and Y conditions are obtained, if the X and Y conditions, under which learning values A, B and C are obtained, are designated to the same unit cell area, the last learning value (e.g., learning value C) is overwritten in the previous learning value (e.g., learning value B) stored in the same cell without distinguishing the conditions.

To solve this problem, it is necessary to subdivide the learning cell into a plurality of smaller cells such that the learning values obtained under different X and Y conditions can be stored in the respective areas. However, if the number of cells increases, a significant number of learning times is required to store the learning values in the respective cells.

For example, if the memory area is divided into 1,000,000 virtual cells, at least 1,000,000 learning times are required.

As such, in order to store most of the learning values obtained under various conditions in the respective areas of the learning memory corresponding to the respective conditions, it is necessary to further subdivide the storing areas of the learning memory divided for the respective conditions (i.e., an increase in m). If so, a significant number of learning times is required to store all of the learning values in the subdivided memory areas, and thus significantly reducing the convergence efficiency of the learning values.

To improve the efficiency of storing the learning values, it is necessary to reduce the number of cells divided in the learning memory. However, if so, the learning values obtained under slightly different conditions are stored in the same learning memory area (i.e., the same learning cell) by overwriting as mentioned above, and thus the difference between the conditions is not distinguishable from the stored learning values.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for storing data in a memory, which can efficiently store a learning value, obtained based on each variable condition, in a learning memory area subdivided for each condition.

In an aspect of the present invention, the method for storing data in a memory may include the steps of when the data may be obtained under a variable condition, determining a cell corresponding to an area of the variable condition from an entire memory area, storing the data in the cell and dividing the cell storing the data into a plurality of cells, and whenever a new data may be obtained under a new variable condition, determining a new cell corresponding to an area of the new variable condition under which the new data may be obtained, from the plurality of cells of the entire memory area and repeating storing of the new data and dividing of the new cell.

The new data may be stored in the new cell.

In another aspect of the present invention, the method may further include the steps of after the storing of the data, determining whether a prohibition of cell division may be previously established with respect to the corresponding cell, and after the dividing of the cell, when each of the divided cells may be subdivided into a plurality of predetermined smallest unit cells, establishing next prohibition of cell division with respect to the smallest unit cell, wherein when the prohibition of cell division may be established with respect to the cell storing the data or the new cell storing the new data, the dividing of the cell storing the data may not be performed.

The data may be a learning value obtained based on a variable condition in a learning control process of a control unit.

The data may be a learning value obtained based on an operating condition of a vehicle in a control unit of the vehicle.

The data may be a learning value obtained based on a control variable condition of a transmission of the vehicle.

In the dividing of the cell or the new cell, the cell storing the data or the new cell storing the new data may be divided into a predetermined number, k×k (k may be a natural number equal to or greater than 2), of equal cells.

Other aspects and preferred embodiments of the invention may be discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
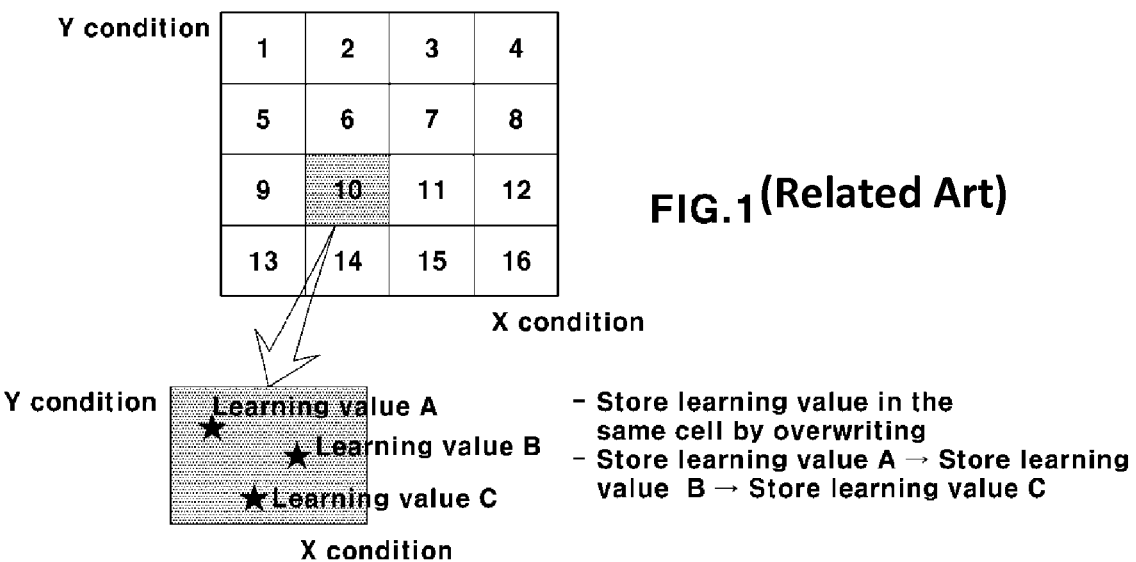
FIG. 1 is a diagram showing a conventional method for storing learning values.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention provides a method for storing data in a memory, which can rapidly distribute and store data, generated under each variable condition, in each smallest unit cell of a memory whose data storage area can be divided into a plurality of virtual cells.

To this end, the present invention provides a method for storing data in a memory, the method including the steps of: when a data is obtained under a specific variable condition, determining a cell corresponding to an area of the variable condition from the entire memory area, storing the data in the cell and dividing the cell storing the data into a plurality of cells, and whenever a new data is obtained under a new variable condition, determining a cell corresponding to an area of the variable condition, under which the new data is obtained, from the plurality of cells of the entire memory area and repeating the storing of the data and the dividing of the cell.

Here, the data may be a learning value obtained based on each variable condition in a learning control process of a control unit, and thus the present invention can be usefully applied to a method for storing a learning value, calculated based on each variable conditions by a control unit of a vehicle, in a memory.

In this case, the learning values calculated by the control unit of the vehicle can be efficiently stored in a plurality of learning memory areas subdivided for the respective variable conditions.

Especially, it is possible to store the learning values obtained under slightly different conditions and reduce the number of learning times until the thus obtained learning values are all stored in the subdivided memory areas (i.e., the smallest unit cells), thereby improving the convergence efficiency of the learning values. Moreover, it is further possible to increase the distinguishability between different variable conditions under which the learning values are obtained, thereby improving the control accuracy.

Figure 2:
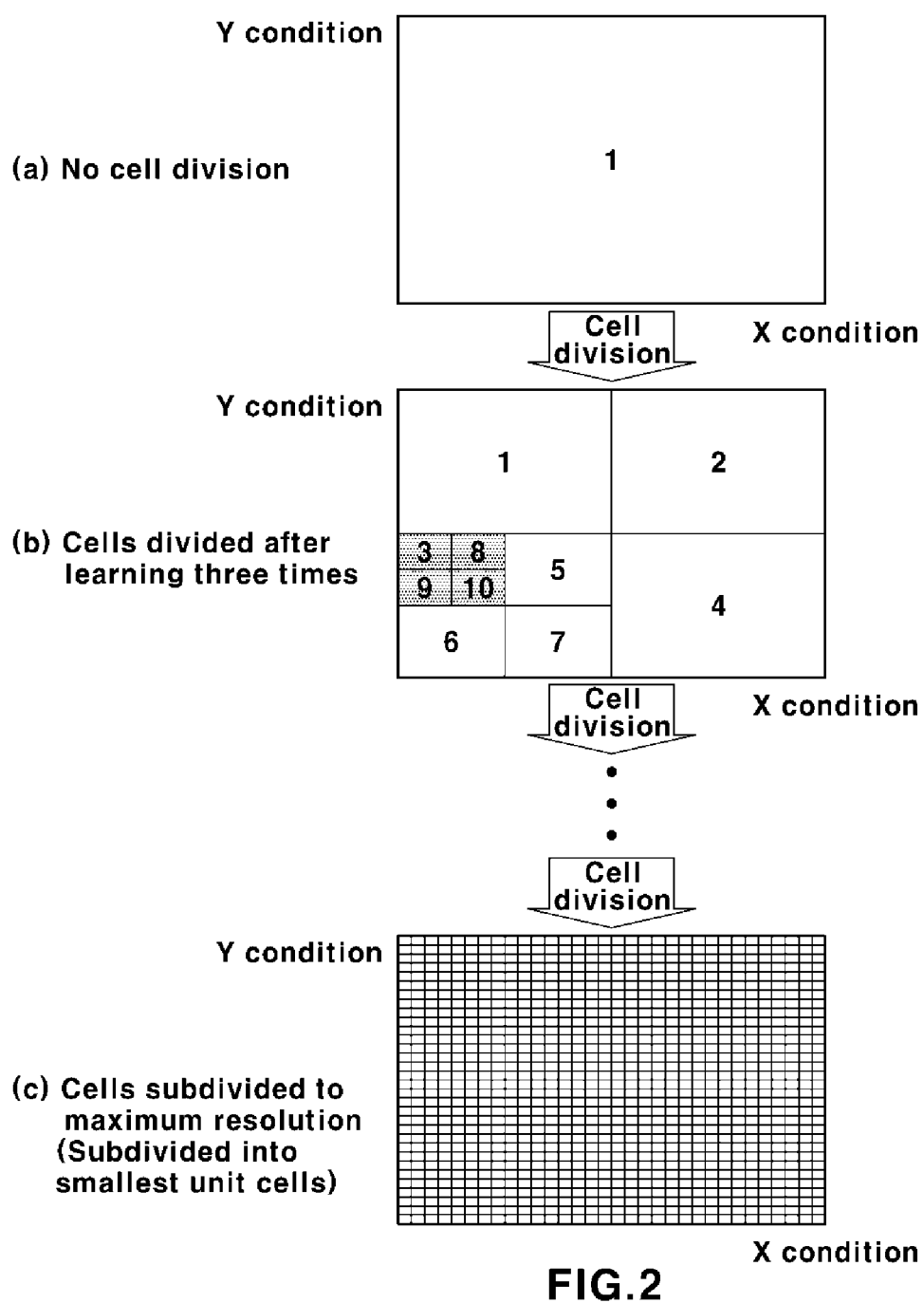
FIG. 2 is a flowchart showing a learning value storing process in accordance with an embodiment of the present invention.

FIG. 2 is a flowchart showing a learning value storing process in accordance with an exemplary embodiment of the present invention, in which a learning value storing process performed by a transmission control unit (TCU) is exemplified.

Figure 3:
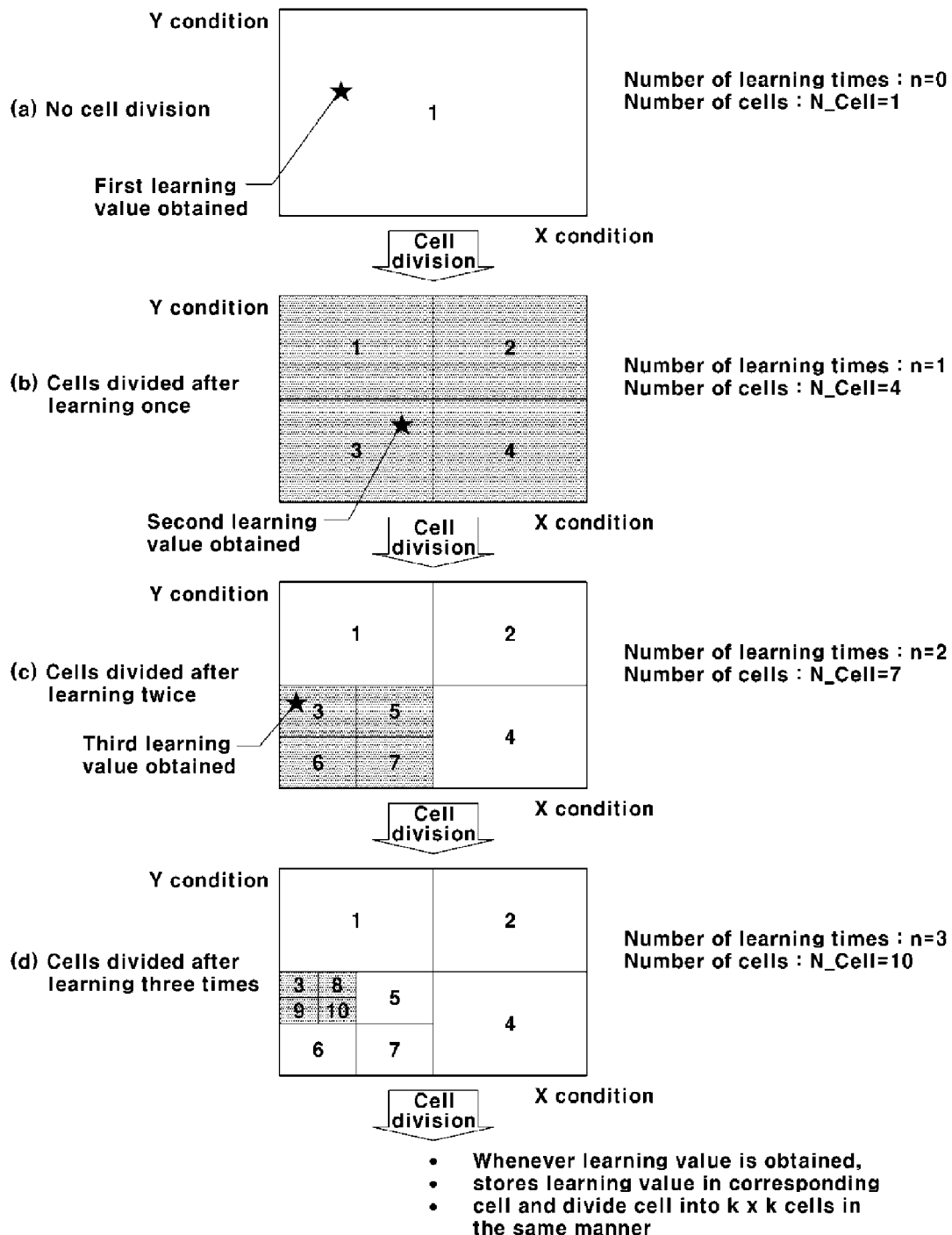
FIG. 3 is a diagram showing the concept of a method for storing learning values in accordance with an embodiment of the present invention.
Figure 4:
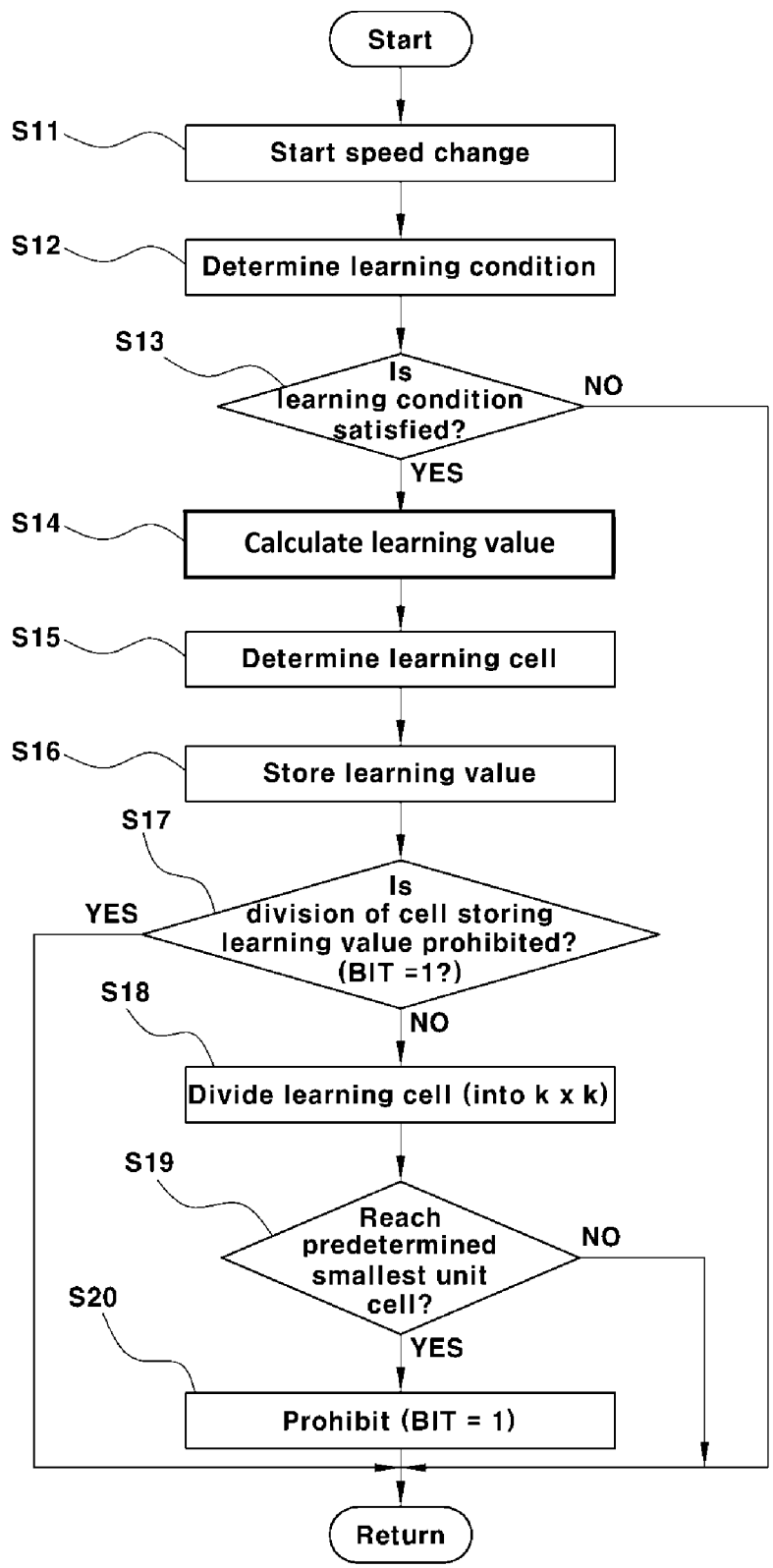
FIG. 4 is a diagram showing a learning value storing process and a cell dividing process in a method for storing learning values in accordance with an embodiment of the present invention.

Moreover, FIG. 3 is a diagram showing the concept of a method for storing learning values in accordance with an exemplary embodiment of the present invention, and FIG. 4 is a diagram showing a learning value storing process and a cell dividing process in a method for storing learning values in accordance with an exemplary embodiment of the present invention.

In an exemplary embodiment of the present invention, the basic process of calculating a learning value and determining a cell in which the learning value is to be stored from the entire memory area is the same as the conventional one. As shown in FIG. 4, in this basic process, it is determined whether the current state corresponds to a predetermined learning condition and, if the learning condition is satisfied (S11 to S13), a learning value is calculated based on a variable condition such as a vehicle speed, oil temperature, input torque, etc., (S14). Then, a learning cell in which the learning value is to be stored is determined based on the variable condition (under which the learning value is obtained) (S15).

Here, the variable conditions may be the vehicle speed, oil temperature, input torque, etc. in an example of the transmission control unit. However, the variable conditions may be various sensor values or operating conditions, which are required for the learning control, and various control parameters obtained by the previous calculation.

When the learning value is obtained and the learning cell in which the obtained learning value is to be stored is determined based on the variable condition under which the learning value is obtained, the learning value is stored (S16). Then, the method of the present invention further includes a process of dividing the corresponding learning cell into a predetermined number, i.e., k×k (k is a natural number equal to or greater than 2), of cells (S18), and this process of dividing the learning cell into k×k cells is repeatedly performed whenever a new learning value is obtained and stored.

That is, when a position in the memory area is determined based on the variable condition (e.g., X and Y conditions in FIGS. 2 and 3) under which the learning value is obtained, a process of determining the cell, to which the position of the variable condition belongs, as the learning cell, in which the learning value is to be stored, storing the learning value in the corresponding cell, and dividing the learning cell storing the learning value into k×k cells is performed.

Subsequently, whenever a new learning value is obtained, the new learning value is stored in the learning cell, to which the position of the variable condition belongs, and the learning cell storing the new learning value is divided again into k×k cells. Then, whenever a new learning value is obtained, a cell corresponding to the position of the variable condition is determined from the entire memory area, which has been divided into a plurality of cells, and the new learning value is stored in the corresponding cell.

In a preferred embodiment, the memory area can be subdivided into a plurality of predetermined smallest unit cells in terms of the maximum resolution, and thus the learning value storing process of the present invention may further include, after storing the learning value in a cell, a process of determining whether a prohibition of division is previously established with respect to the corresponding cell, i.e., whether the division of the corresponding cell is previously prohibited (S17) and, after dividing the cell, if each of the divided cells is subdivided into a plurality of predetermined smallest unit cells, a process of establishing the next prohibition of division with respect to the smallest unit cell, i.e., a process of prohibiting the division of the smallest unit cell (S19 and S20).

That is, as shown in FIG. 2, when the learning value is stored in a cell (S16), it is determined whether the prohibition of division with respect to the cell storing the learning value is previously established before subdividing the corresponding cell (S17), thereby determining whether the corresponding cell is subdivided into the smallest unit cells.

Here, if the prohibition of division is not established, that is, if the cell storing the learning value can be further subdivided, the corresponding cell area is subdivided into k×k cells. On the contrary, if the prohibition of division is established, that is, if the cell storing the learning value is subdivided into the smallest unit cells, the next learning value is stored without the cell division.

Here, if the entire memory area may be subdivided into 1,000,000 smallest unit cells, each of the smallest unit cells is a memory area corresponding to one-millionth of the entire memory area.

According to the above-described learning value storing process of the present invention, whenever the learning value is stored, the cell storing the learning value is subdivided into k×k cells, and thus it is possible to precisely store the learning values in the subdivided memory areas.

That is, as shown in FIG. 3, in the case where the cell is to be subdivided into 2×2 cells, if a first learning value is obtained in a non-divided state, the corresponding learning value is stored (or propagated) in the entire memory area, which is not divided, and then the memory area is divided into four equal cells.

Subsequently, when a second learning value is obtained, the corresponding learning value is stored in one area (i.e., cell), in which the learning value is obtained, of the four divided areas, and then the corresponding area is subdivided into four equal cells.

A third learning value obtained and stored in the above manner is shown in FIG. 3 (C). When this process is repeatedly performed whenever a new learning value is obtained, it is possible to rapidly subdivide the memory areas, in which the learning values are to be stored, store the learning values based on the subdivided conditions, and reduce the time that the learning values are stored in all the smallest unit cells and the number of learning times.

Here, the division of the memory area into four equal cells (2×2) is merely an example, and if the memory area is to be divided into a larger number of cells (k×k, where k is a natural number equal to or greater than 3), it is possible to more rapidly subdivide the learning cells and efficiently store the data in the subdivided learning cells.

FIG. 4 shows that the learning value storing process and the cell division process are repeatedly performed until the entire memory area is subdivided into the predetermined smallest unit cells. If a certain cell is subdivided into the smallest unit cells, the prohibition of division is established with respect to the corresponding cell to prohibit the division of the cell next time.

As such, in an exemplary embodiment of the present invention, after the learning value is stored in a certain cell, the corresponding cell is subdivided into a plurality of cells by the cell division process, and thus the time required for the learning values to be stored in the smallest unit cells, i.e., the number of learning times is reduced. As a result, the convergence speed of the learning values can be significantly increased.

For example, when the entire memory area is divided into 1,000,000 cells to store data, it is possible to solve the conventional problem of data overwrite (i.e., all of the previously stored data is deleted), and thus it is possible to store the data under much more variable conditions within a short period of time. Moreover, it is possible to uniformly distribute and store the data in a greater number of cells and reduce the number of learning times (conventionally, at least 1,000,000 times of learning are required).

In FIG. 3, the respective steps are shown in more detail with reference to an example where the cell is divided into 2×2 cells. When the learning is not performed, the cell is not divided, and thus the entire memory area corresponds to a single cell in which a learning value is to be stored.

At this time, when a first learning value is obtained, the learning value is stored in the entire memory area, and then the entire memory area is divided into four cells.

Then, when a new learning value, i.e., a second learning value, is obtained, the second learning value is stored (or propagated) only in the cell of the condition under which the learning occurs. Next, one cell corresponding to the position of the variable condition, under which the learning value is obtained, is selected from the four cells, and the second learning value is stored in the selected cell. Then, the cell storing the second learning value is subdivided into four cells.

Subsequently, when a third learning value is obtained, the third learning value is stored only in the cell of the variable condition under which the learning value occurs. Next, one cell corresponding to the variable condition, under which the learning value is obtained, is selected from the four subdivided cells, and the third learning value is stored in the selected cell. Then, the cell storing the third learning value is subdivided into four cells.

In the same manner, whenever a new learning value is obtained, the learning value is stored in the corresponding cell, and the cell is subdivided again into 2×2 cells.

From this rule, the number of cells divided according to the number of learning times can be calculated based on the following Formula 1.

$$N\_Cell=(n-1)(2^2-1)+2^2 \quad \text{[Formula 1]}$$

Moreover, the above rule is generalized to the number of divided cells k×k, the number of divided cells can be calculated based on the following Formula 2.

$$N\_Cell=(n-1)(k^2-1)+k^2 \quad \text{[Formula 2]}$$

Therefore, if the entire memory area is divided into the same number of smallest unit cells, according to the cell division process of the present invention, the data overwrite can be minimized, and the data storing speed for storing the learning value can be increased, compared to the conventional method in which the entire memory area is pre-divided into a plurality of cells and the data is stored in each cell.

Especially, according to an exemplary embodiment of the present invention, after the cell division, the previous data may be deleted by overwriting a new data generated under the same condition in the corresponding cell. However, the previous data remains in other divided areas, and thus the time that the data is stored in all the unit cells can be significantly reduced.

As such, in the method for storing the learning values in the cell division manner according to an exemplary embodiment of the present invention, it is possible to store the learning values obtained under slightly different conditions in the subdivided memory areas and reduce the time that the learning values are stored in all the smallest memory areas and the number of learning times. As a result, it is possible to increase the distinguishability between different conditions under which the learning values are obtained, improve the control accuracy by the use of the stored learning values, and improve the convergence efficiency of the learning values.

The above-described method for storing the learning values in the cell division manner is not limited to the control unit in the vehicle, e.g., the engine control unit or transmission control unit, but can be generally applied to various fields such as communications, computers, etc., which need to store data obtained under any variable conditions in a memory area having a predetermined capacity.

However, in the above exemplary embodiment of the present invention, it has been exemplified that the data is a learning value obtained under the variable condition, especially, a learning value obtained based on the operating condition of the vehicle or based on the variable condition for controlling the transmission of the vehicle.

Moreover, in the above-described present invention, a microprocessor performs the respective processes shown in FIG. 4 such as the calculation of the learning value based on the variable condition (S14), the determination of the learning cell (S15), the storing of the learning value in the memory (S16), the determination of the prohibition of division with respect to the cell (S17), the cell division (S18), the establishment of the prohibition of division (S19 and S20). The information on the cell division in the memory area in the respective steps, the information on the prohibition of division established in each cell, etc. may be stored in a separate auxiliary memory or in a separately allocated memory area under the control of the microprocessor.

As described above, according to the method for storing data in a memory of the present invention, it is possible to efficiently store the calculated learning values in the learning memory areas subdivided for the respective variable conditions.

Especially, it is possible to store the learning values obtained under slightly different conditions and reduce the number of learning times until the thus obtained learning values are all stored in the subdivided memory areas (i.e., the smallest unit cells), thereby improving the convergence efficiency of the learning values. Moreover, it is further possible to increase the distinguishability between different variable conditions under which the learning values are obtained, thereby improving the control accuracy.

The method for storing the learning values in the cell division manner is not limited to the control unit in the vehicle, e.g., the engine control unit or transmission control unit, but can be generally applied to various fields such as communications, computers, etc., which need to store data obtained under any variable conditions in a memory area having a predetermined capacity.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for storing data in a memory, the method comprising the steps of:
   when the data is obtained under a variable condition, determining a cell corresponding to an area of the variable condition from an entire memory area;
   storing the data in the cell and dividing the cell storing the data into a plurality of cells; and
   whenever a new data is obtained under a new variable condition, determining a new cell corresponding to an area of the new variable condition under which the new data is obtained, among the plurality of cells of the entire memory area and repeating storing of the new data in the new cell and dividing of the new cell.

2. The method of claim 1, wherein the new data is stored in the new cell.

3. The method of claim 1, wherein the data is a learning value obtained based on a variable condition in a learning control process of a control unit.

4. The method of claim 3, wherein the data is a learning value obtained based on an operating condition of a vehicle in a control unit of the vehicle.

5. The method of claim 3, wherein the data is a learning value obtained based on a control variable condition of a transmission of the vehicle.

6. The method of claim 1, further comprising the steps of:
   after the storing of the data, determining whether a prohibition of cell division is previously established with respect to the corresponding cell; and
   after the dividing of the cell, when each of the divided cells is subdivided into a plurality of predetermined smallest unit cells, establishing next prohibition of cell division with respect to the smallest unit cell,
   wherein when the prohibition of cell division is established with respect to the cell storing the data or the new cell storing the new data, the dividing of the cell storing the data is not performed.

7. The method of claim 6, wherein the data is a learning value obtained based on a variable condition in a learning control process of a control unit.

8. The method of claim 7, wherein the data is a learning value obtained based on an operating condition of a vehicle in a control unit of the vehicle.

9. The method of claim 7, wherein the data is a learning value obtained based on a control variable condition of a transmission of the vehicle.

10. The method of claim 1, wherein in the dividing of the cell or the new cell, the cell storing the data or the new cell storing the new data is divided into a predetermined number, $k \times k$ (k is a natural number equal to or greater than 2), of equal cells.

* * * * *